(12) United States Patent
Perez De Larraya Sagues

(10) Patent No.: US 9,216,709 B2
(45) Date of Patent: Dec. 22, 2015

(54) DEPLOYABLE STRUCTURE TO PROVIDE PROTECTION WHEN VEHICLES ROLL OVER

(71) Applicant: Carmelo Perez De Larraya Sagues, Pamplona (ES)

(72) Inventor: Carmelo Perez De Larraya Sagues, Pamplona (ES)

(*) Notice: Subject to any disclaimer, the term of this patent is extended or adjusted under 35 U.S.C. 154(b) by 0 days.

(21) Appl. No.: 13/991,546

(22) PCT Filed: Nov. 13, 2012

(86) PCT No.: PCT/ES2012/070790
§ 371 (c)(1),
(2) Date: Jun. 4, 2013

(87) PCT Pub. No.: WO2013/083864
PCT Pub. Date: Jun. 13, 2013

(65) Prior Publication Data
US 2015/0102591 A1 Apr. 16, 2015

(30) Foreign Application Priority Data
Jul. 3, 2012 (ES) .................................. 201231039

(51) Int. Cl.
*B60R 21/13* (2006.01)
*B62D 49/08* (2006.01)
*B60R 21/00* (2006.01)

(52) U.S. Cl.
CPC .............. *B60R 21/131* (2013.01); *B62D 49/08* (2013.01); *B60R 2021/0018* (2013.01); *B60R 2021/135* (2013.01)

(58) Field of Classification Search
CPC ............ B60R 21/131; B60R 2021/134; B60R 2021/135; B60R 2021/0018; B60R 2021/0076
See application file for complete search history.

(56) References Cited

U.S. PATENT DOCUMENTS

| 3,802,720 | A | * | 4/1974 | Ellis | ............................... 280/755 |
| 2005/0156422 | A1 | * | 7/2005 | Della Valle | ...................... 280/756 |
| 2005/0280253 | A1 | * | 12/2005 | Queveau et al. | ............... 280/756 |
| 2006/0001248 | A1 | * | 1/2006 | Queveau et al. | ............... 280/756 |

FOREIGN PATENT DOCUMENTS

| CH | 559646 A | * | 3/1975 |
| WO | WO 0204259 A1 | * | 1/2002 |

* cited by examiner

*Primary Examiner* — Drew Brown
(74) *Attorney, Agent, or Firm* — Jesus Sanchelima, Esq.; Christian Sanchelima, Esq.

(57) ABSTRACT

A deployable structure to provide protection when vehicles roll over, which is made up of a "V" shaped structure (1) closed at the top where both the lateral vertical bars (4) and the uppermost horizontal bar (7) can fold and unfold telescopically, resulting in an increase in the width and the height of the structure when changing from the folded to the unfolded positions. The lower end of the tubular vertical lateral elements (4) of the structure are conveniently coupled to the chassis of the vehicle (2) in question, with the structure (1) being deployed when a certain tilt of the vehicle is detected by means of a tilt sensor using an activation control or algorithm.

9 Claims, 6 Drawing Sheets

DEPLOYABLE STRUCTURE TO PROVIDE PROTECTION WHEN VEHICLES ROLL OVER

FIELD OF THE INVENTION

This invention refers to a deployable structure that provides protection when vehicles roll over, and more specifically to one that can be deployed automatically, without the intervention of the driver, when either a machine, self-propelled equipment or an open-top vehicle, such as a tractor rolls over, thus protecting the driver.

The aim of this invention is to produce a structure whose height and width dimensions increase when deployed, in order to provide efficient protection to the tractor driver.

BACKGROUND TO THE INVENTION

Roll-over is a type of accident, fatal in many cases, frequently suffered by tractor drivers when driving over rough terrain, on the sides of slopes, ditches, etc. To reduce the number of accidents some devices have been developed, apart from fixed protective structures, to ensure that the driver is protected when the tractor rolls over.

Patent US2007/0182147 can be mentioned in this respect, which describes a frame with two articulated lateral sides mounted on a support attached to the tractor itself, and with a number of elastic elements that allow the folding and unfolding of the structure.

The structure in that patent is intended to be fitted to the back of the driver's seat, which means that in some cases the driver is not completely protected on roll over, regardless of the complex structure and possible failures in the folding and unfolding operations. Furthermore, it does not offer an automatic activation that guarantees its operation independently of the driver's wish.

Nor is such automatic operation included in the anti-rollover protection system described in patent European EP870298, thus limiting its action to passive protection, considering its location behind the driver's seat.

Patent US2004/0145172 can also be mentioned, having similar characteristics to those described above, being fitted with a structure intended preferably for vehicles equipped with shovel and excavator. In this patent, however, the protective structure is even more complex than the previous instances though without solving their problems.

In European patent EP0500261, on the other hand, the structure consists of two articulated sections, one attached to the vehicle structure or frame and the other telescopic part protrudes from the first section and is capable of being automatically deployed in the case of rollover, but without changing the geometry so the maximum width remains the same.

Swiss patent CH559646 describes an anti-roll over device made up of a "V" shaped structure closed at the top that can be adapted to different vehicles due to the telescopic nature of the upper horizontal section, but with manual activation and fastening to adapt its width to that of the vehicle, while keeping its shape and only acting as a static protection element.

The rollover protection device described in patent document WO0204259 is retractable, consisting of an inverted "U" shaped arch with telescopic vertical tubes and a horizontal bar which is deployed when rollover is imminent by means of a sensor activated when the dowels that hold the deployable bars are freed by pneumatically triggering the action of springs which, in turn, push the telescopic bars, moving them vertically without increasing the width of the structure when deployed.

Similarly, the device designed for individual protection described in patent publication US2010171296 consists of an inverted "U" structure arranged in such a way as to be activated when sensors detect a rollover, propelling the protection bar by using gas to cause a wholly vertical deployment. As in the previous case, it does so without increasing the width of the structure.

None of the structures referred to above completely solve the problem arising from a tractor or similar vehicle rolling over, regardless of the complexity of their construction. More importantly, in most of them, the folding and unfolding motions require mechanical articulation elements which, undoubtedly, give rise to extra stress and possible trapping of the driver, except for patents EP0500261, WO0204259 and US2010171296, whose automatic action relies on mechanical elements that require a high level of maintenance, all of them offering limited protection since there is no horizontal deployment in the upper part of the structure.

SUMMARY OF THE INVENTION

It is one of the objects of the invention to provide an automatically deployable structure to protect an open-top vehicle in a roll over.

DESCRIPTION OF THE DRAWINGS

To complement the explanation given below and in order to provide a better understanding of the characteristics of the invention, in accordance with a preferred embodiment of its practical application, a set of drawings has been provided by way of illustration but without limitation, as an integral part of that description, as follows.

EMBODIMENTS OF THE INVENTION

Figure 1:
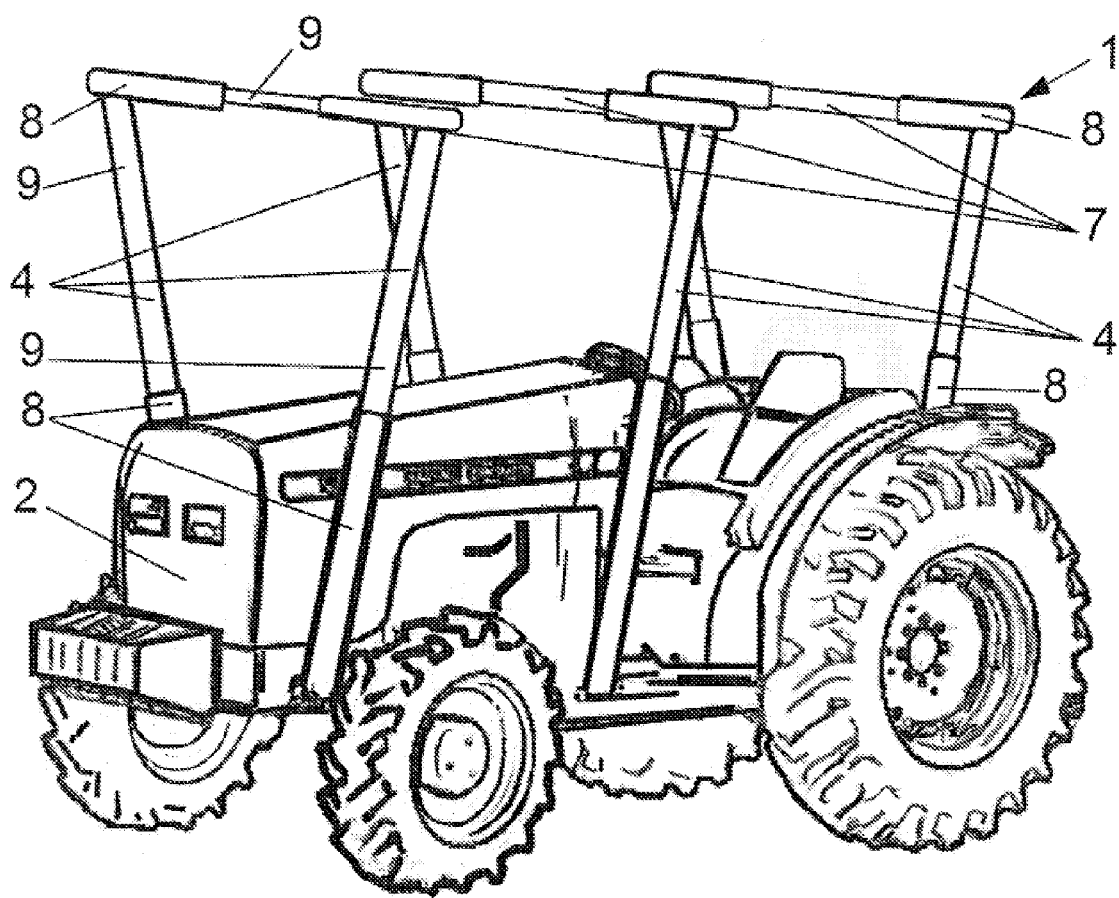
FIG. 1 shows an isometric representation of a tractor with three structures in the deployed position, to provide protection to the driver (not shown) of the vehicle in the event the vehicle rolls over.

The proposed deployable structure has been designed to solve the problems explained above, by means of a simple and efficient solution. Said deployable protective structure is based on the articulation of a "V" shaped frame closed at the upper end, whose vertical lateral bars, as well as the bar situated in the uppermost horizontal position, are retractable and consist of telescopically mounted profiles, thus constituting a structure controlled by a system of commands associated with a bi-axial tilt sensor, which is deployed when the vehicle reaches a certain tilt that will inevitably cause it to roll over; so when the upper horizontal structure widens and rises, causing the lateral bars to elongate, the height and width dimensions will increase, providing complete protection to the driver by increasing his/her safety space.

An ideal application is on a machine, self-propelled equipment or open-top vehicle, such as a tractor, and depending on its weight and size, may carry either one structure, placed preferably in front of the driver; two structures, one located in front of the driver and another behind the driver's seat; or several identical structures, one in front of the driver, another in the corresponding position behind the driver's seat and an intermediate one, so that all the structures are activated simultaneously by means of a single sensor system to facilitate deployment at the same time.

Therefore, this is a structure that is deployed automatically with simultaneous variations in its geometry, resulting in the elevation of the structure itself thus increasing its height and width simultaneously.

In the folded position, that is, while inert or inactive, the structure reaches a height at which the uppermost horizontal bar will be level or slightly higher than the head of the vehicle driver, so that the automatic deployment will only take place in case of rollover, thus providing active safety that is independent of the action of the driver and extremely efficient at the time of a rollover.

Changing from the folded to the unfolded position does not depend on the actions of the driver, but, as previously mentioned, is controlled by sensors and the manoeuvre is carried out by means of a biaxial tilt meter and a safety activation algorithm which ensures that a change from the inert position to operative takes place every time a roll over occurs, avoiding undesired deployment during normal use of the vehicle or in other specific situations such as possible tilts due to repairs, loads, etc.

The safety activation algorithm consists of establishing a number of variables, controlled by sensors, which must coincide in order to initiate the deployment of the structure in such a way that neither the driver nor any other operator are affected.

The tilt meter and controls can be positioned anywhere on the vehicle or the deployable structure so that, responding to the action of said sensor, the corresponding devices to generate the gas pressure needed to unfold the structure are activated once the requirements established by the activation algorithm (controls) have been met. These devices could consist, for instance, of one or several pressured gas vials, similar to those used in airbags, which are triggered by the tilt sensor and release the gas suddenly and immediately to produce the deployment of the structure, with the peculiarity that the pressured gas vials may even be situated inside the tubular frame, preferably in the central area of the horizontal bar found in the uppermost part of the structure.

It must also be pointed out that the structure will include blocking mechanisms to immobilise itself both in the folded or the unfolded positions. In addition to those already existing in the market, the proposed design for this blocking mechanism consists of semi-circular buffers connected to the ends of each of the elastic rods or straps attached to the bases or to the ends of the fixed tubular bars at the sides of the structure, or to the sides of its upper bar. These semi-circular buffers are initially set at an inert position inside the corresponding sliding section of each of the bars that make up the structure, said internal sliding bar also having buffers to limit its extensibility and therefore that of the whole structure.

The elastic rods or straps attached to the bottom end of the fixed tubular section, both lateral and vertical, as well as at both distal ends of the tubes supporting the uppermost horizontal bar, are kept taut and virtually parallel whilst in the inert position so that the moment the pressure devices are activated, that is, when the gas contained in those devices is released, the semi-circular buffers are freed from the deployable tubes where they are initially housed, moving until they butt against the external tubes; thus locking the tubes in position and preventing them from folding back as their movement is restricted; this action also gives rigidity to the structure in the deployed position.

The stationary sections of tube or the ends, from which the sliding tubes corresponding to the lateral and uppermost bars are displaced, are attached to stoppers; the ones at the ends are closed and the others open to allow the sliding tubes to pass. The elastic rods or straps are attached to the closed stoppers, either screwed on, to allow them to be interchangeable or disassembled, or by a more permanent means of fastening such as welding or another means of fastening. On the other hand, the open stoppers act as buffers to the sliding tubes in their displacement, providing an end to that movement, in conjunction with the guiding tabs located on the outside of the sliding tubes.

As an option, elastic pads to be incorporated to the structure can be supplied together with the fixed tube sections in order to ensure good quick response of the elastic rods, between which the pads would be placed, resulting in maximum tension to the rods when in the folded position; these elastic pads could be in the shape of a ball made of any flexible material that will naturally tend to expand, such as silicon or similar, or could be springs or coils.

Finally, the sets of semi-circular buffers in the devices that lock the vertical bars in the folded position will be supplemented by an elastic joint that will facilitate an almost airtight seal, whilst the tubes that make up the structure can be provided with small holes to allow the gas released during the unfolding action to escape, dispelling excess pressure to the outside of the structure once the deployment is complete.

Figure 2:
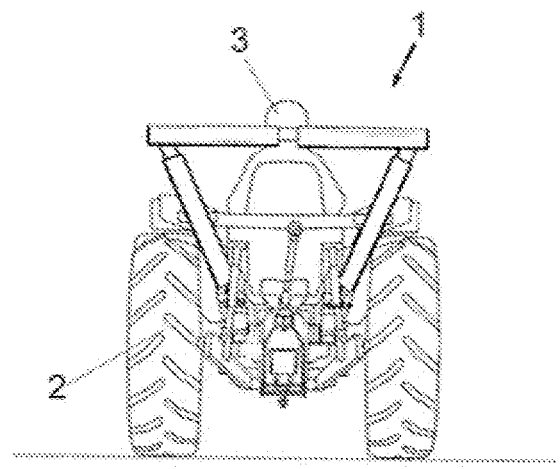
FIG. 2 is an elevational view from the rear of the tractor in the previous figure with the deployable structure in the folded position.
Figure 3:
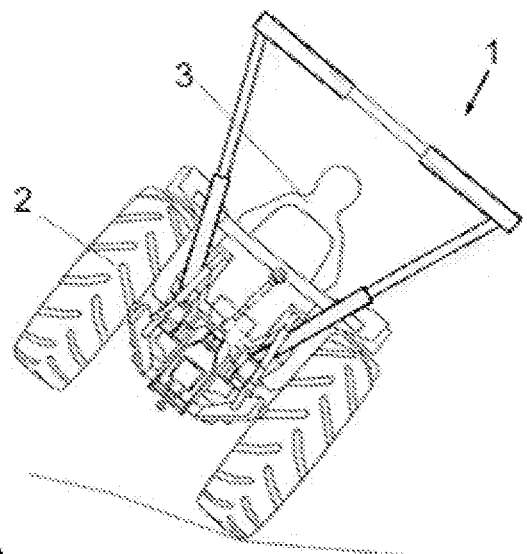
FIG. 3 is an elevational view of the tractor in the previous figure in a rollover situation with the structure already deployed.

As shown in the above mentioned diagrams, and specifically FIGS. 1, 2 and 3, the structure (1) of the invention is designed to be mounted on a vehicle or tractor (2), with the objective of protecting the driver (3) in the case of rollover. FIG. 1 shows three identical structures (1) placed at the front, middle and back of the vehicle or tractor (2), while FIG. 3 shows the tractor (2) in an imminent rollover situation where the structure (1) has been deployed.

In each case, structure (1) approximates of a "V" shaped configuration closed at the top, whose substantially vertical side bars (4) are tubular and attached to the chassis of the vehicle or tractor (2), whilst the uppermost transverse bar (7) is arranged horizontally and is also tubular.

Figure 4:
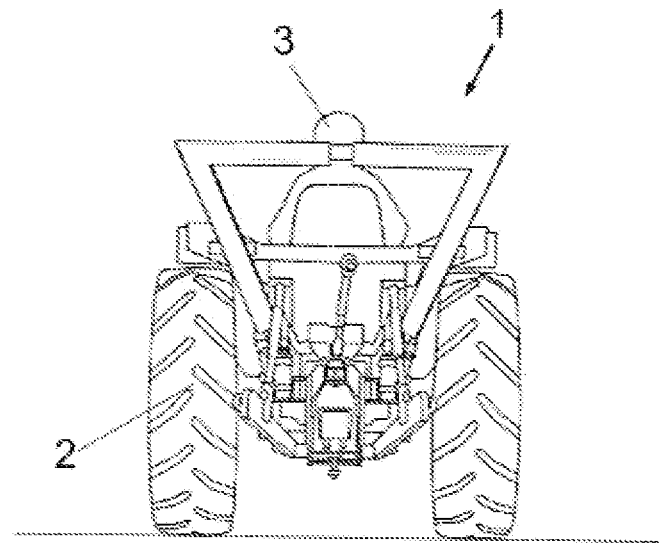
FIGS. 4 and 5 Correspond to the representations in FIGS. 2 and 3, showing an alternative embodiment of the invention with another method for the retractable telescopic insertion of the sliding tubes.
Figure 5:
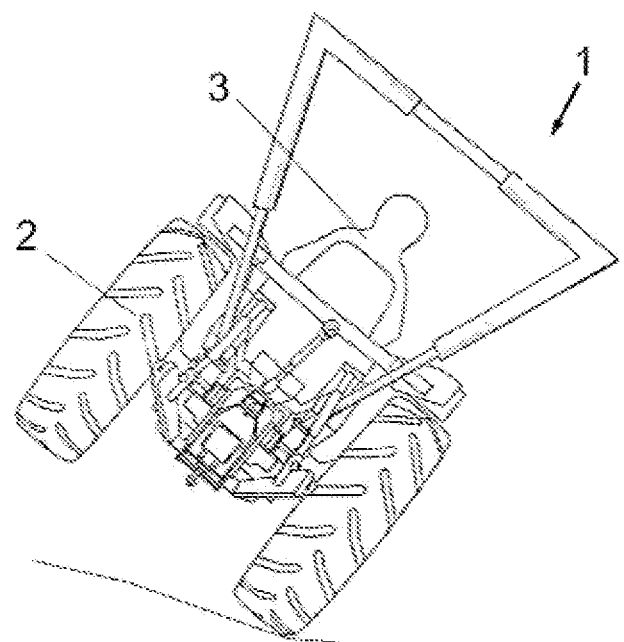
Figure 6:
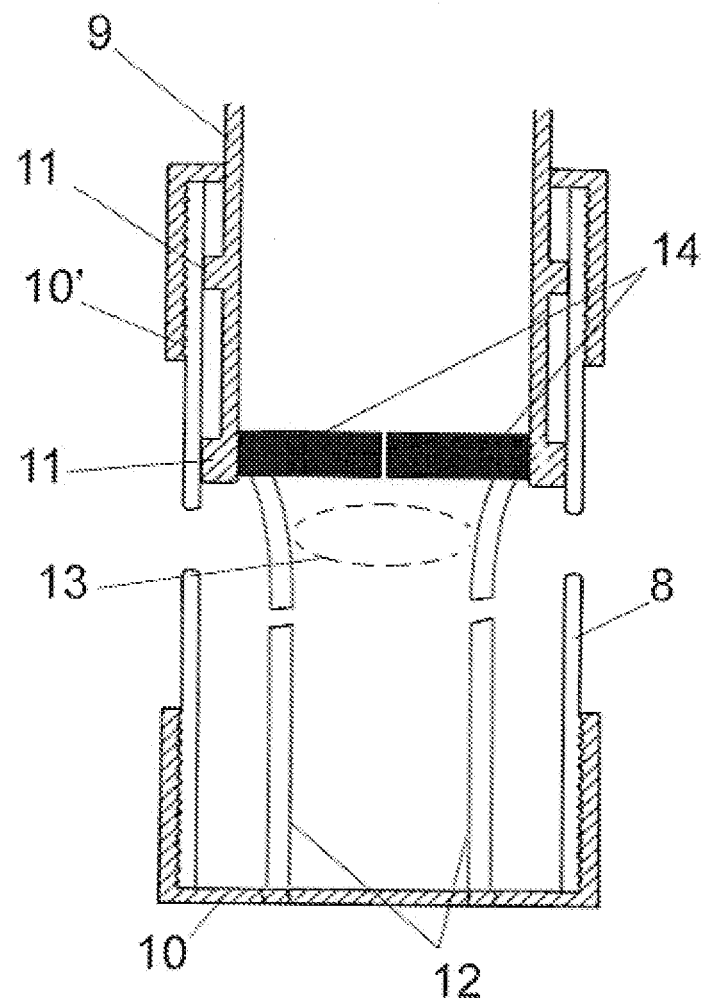
FIG. 6 shows a cross-section enlarged view of the blocking mechanisms that operate in the structure represented in previous figures, displayed in the initial or inert position.
Figure 7:
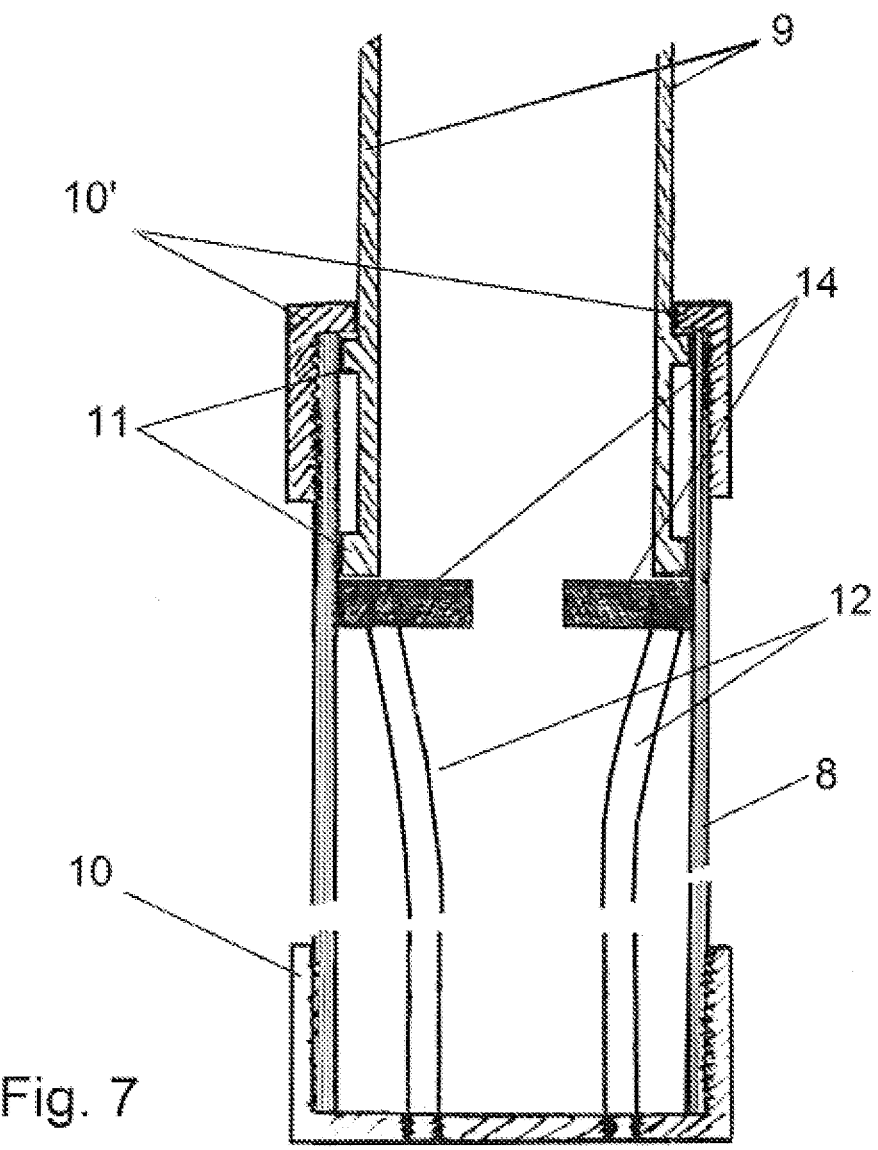
FIG. 7 shows a cross-section view, similar to the one in the previous diagram, but in the blocked position at the end of the deployment.
Figure 8:
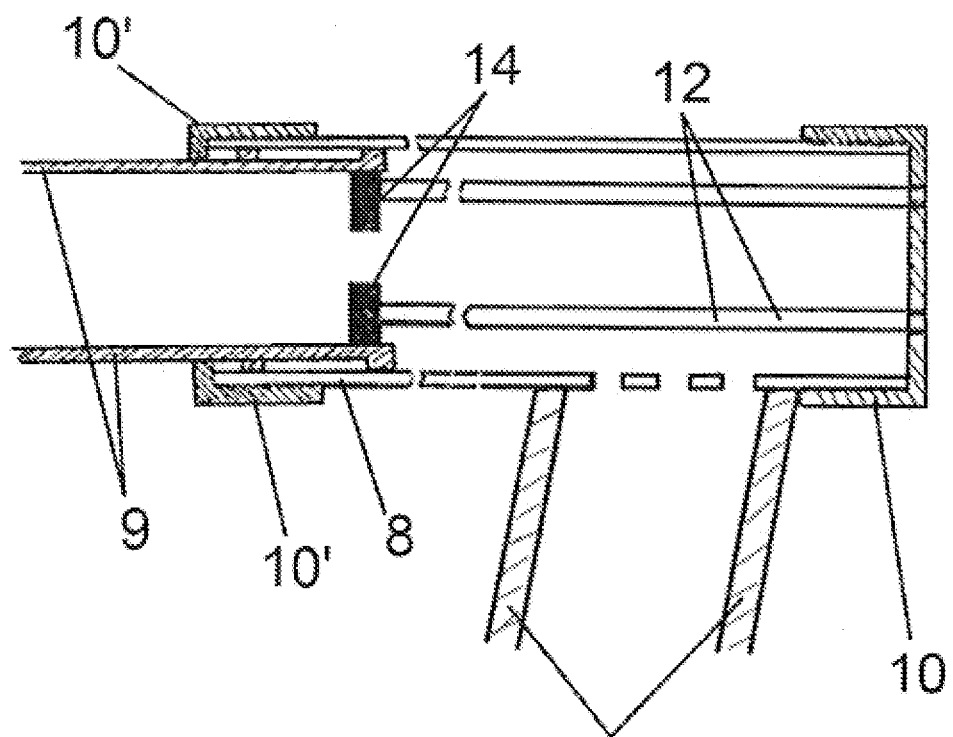
FIG. 8 shows a cross-section enlarged view of the blocking mechanisms located in the distal ends of the uppermost bar of the structure in the initial or inert position.

Both side bars (4) and uppermost transverse bar (7) of structure (1) are retractable in order to achieve a folded non operating position as shown in FIGS. 2 and 4, or an unfolded or operating position as indicated in FIGS. 1, 3 and 5.

Each of the structure's lateral vertical bars (4) and the uppermost horizontal bar (7) consist of a fixed tube section (8) and a displaceable telescopic tube section (9), the latter sliding inside the former. The tube (8) has a closed stopper located at its free end and at the other end an open stopper (10'), through which the sliding telescopic tube passes (9); the fixed tube (8) is fitted with guiding tabs that limit the distance travelled by the displaceable tube (9) which can correspond to either the lower position of the lateral bars (4) or the distal ends of the uppermost horizontal bar (7), as best seen in figures.

Similarly, in both cases there are some blocking devices consisting of a pair of rods or straps (12) attached to the stopper (10) that seals the fixed tube (8); with rods (12) being subjected to a tension applied to their curvature which can be increased by means of an elastic pad (13), for example, or any other elastic element with springs or any other suitable component.

In each case, at the end opposite to where the elastic rods (12) are attached to the closed stopper (10), there are two semi-circular buffers (14) which are released at the time of deploying the structure; such deployment can be effected by means of pressurised gas contained in a vial placed inside the tubular frame, and which is activated when the vehicle or tractor (2) rolls over. The activation is triggered by sensors installed in the vehicle or on the tubular frame itself, so that, when the vehicle reaches a certain tilt, the sensors will cause the activation of the aforementioned pressurised gas devices, producing the deployment of the structure. It is at this time that the semi-circular buffers (14) are released, as explained above, and slide until they reach the walls of the fixed tubes (8), thus anchoring the displaced tubes (9) which will not be able to fold back, and giving rigidity to the structure in the deployed position.

The "V" shaped structure closed at the top allows for different combinations and configurations in the way the tubes are arranged. A variance is shown in FIGS. 4 and 5.

The invention includes a tilt meter or bi-axial tilt sensor which activates the pressure devices inside the structure (1) by means of an activation control or algorithm that triggers the deployment of the structure when a certain tilt is reached by the vehicle rolling over.

Finally, it must be mentioned that the structure can be supplemented by a breakdown warning system, either visual and/or aural, which can be activated as soon as the roll over position is reached to alert the driver of the possibility of imminent rollover.

What is claimed is:

1. A deployable structure that provides protection when vehicles roll intended to be used in self-propelled equipment and vehicles including tractors, having a chassis to protect their drivers in cases of rolling over comprising a "V" shaped structure (1) closed at the top, lateral vertical bars (4) and horizontal uppermost bar (7) can be folded and unfolded by a retractable telescopic action that increases the length and width of the structure when it changes from a retracted to each of said deployed position and lateral vertical tubular bars (4) each having a lower end cooperatively mounted to the chassis and further including a tilt meter or bi-axial sensor which, once the vehicle reaches a certain angle of tilt during the roll over process, activates a pressurized gas device located inside the structure (1) activated by a control unit to trigger deployment of the structure upon the occurrence of predetermined conditions.

2. The deployable structure set forth in claim 1 characterized by said control unit being programmed with an algorithm to safely trigger the deployment of the structure.

3. The deployable structure of claim 2 wherein the number of said deployable structures (1) wherein depend on the weight and size of the equipment and vehicle.

4. The deployable structure of claim 3 wherein said pressurized gas device having a vial containing pressurised gas and activated by the sensor that signals the roll-over of the vehicle.

5. The deployable structure of claim 4 that provides protection when vehicles roll over, as stated in the above claims, wherein both the lateral vertical bars (4), and the horizontal uppermost bar (7) of the structure include a fixed tube section (8) fitted with a stopper (10) from which a pair of taut elastic rods or straps (12) protrude inwards, with semi-circular buffers (14) that are freed when the pressurised gas vial that causes the deployment of the structure is activated said semi-circular buffers (14) act as a locking element on the displaceable lateral vertical bars (4) and the horizontal uppermost bar (7) of the structure.

6. The deployable structure of claim 5, characterised by the elastic rods or straps (12) fixed to a closed stopper (10) at the lower end of the fixed tube in the lateral vertical bars (4) and to the distal ends of the horizontal uppermost bar (7) of the structure, which remain taut during the resting position.

7. The deployable structure of claim 1, characterised by the lateral vertical bars (4) and the horizontal uppermost bars (7) being retractable, and fitted with guiding tabs (11) at each end operating as stopping elements to define a point of maximum extensibility of the tubes by butting against a stopper (10) attached to the corresponding end of fixed tubes (8) telescopically receiving each lateral bar (4) and to either side of the horizontal uppermost bar (7) of the tubular frame.

8. The deployable structure of claim 7 the tubes in the structural frame include at least one perforation to allow gas to exit when released during the deployment operation of the structure.

9. The deployable structure of claim 1 further comprising a breakdown warning system, that can be activated immediately before the vehicle rolls over to alert the driver of the possibility of imminent rollover.

* * * * *